United States Patent
Tomozawa et al.

(10) Patent No.: US 10,055,994 B2
(45) Date of Patent: *Aug. 21, 2018

(54) PARKING ASSISTANCE DEVICE

(71) Applicant: AISIN SEIKI KABUSHIKI KAISHA, Kariya-shi, Aichi-ken (JP)

(72) Inventors: Motokatsu Tomozawa, Nagoya (JP); Norio Imai, Anjo (JP)

(73) Assignee: AISIN SEIKI KABUSHIKI KAISHA, Kariya-shi, Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/223,164

(22) Filed: Jul. 29, 2016

(65) Prior Publication Data

US 2017/0032679 A1 Feb. 2, 2017

(30) Foreign Application Priority Data

Jul. 31, 2015 (JP) .................................. 2015-152504

(51) Int. Cl.
*G08G 1/16* (2006.01)
*B62D 15/02* (2006.01)
(Continued)

(52) U.S. Cl.
CPC ........... *G08G 1/168* (2013.01); *B62D 15/027* (2013.01); *B62D 15/028* (2013.01);
(Continued)

(58) Field of Classification Search
CPC .... B62D 15/027; B62D 53/08; B62D 15/028; B62D 3/12; G01C 21/34; G01C 21/3423;
(Continued)

(56) References Cited

U.S. PATENT DOCUMENTS

| 4,931,930 | A | * | 6/1990 | Shyu | ...................... | B60Q 9/007 |
| | | | | | | 180/167 |
| 7,010,412 | B1 | * | 3/2006 | Song | ........................ | E01C 1/00 |
| | | | | | | 345/428 |

(Continued)

FOREIGN PATENT DOCUMENTS

| JP | 2005-35498 A | 2/2005 |
| JP | 2006-508850 A | 3/2006 |

OTHER PUBLICATIONS

Communication dated Jan. 26, 2017 from the European Patent Office in counterpart Application No. 16181847.1.

*Primary Examiner* — Jelani A Smith
*Assistant Examiner* — Luis A Martinez Borrero
(74) *Attorney, Agent, or Firm* — Sughrue Mion, PLLC

(57) ABSTRACT

A parking assistance device includes: a route determination unit that determines a route from an initial position of a vehicle to a target parking position when assisting the vehicle to be parked in a parking area, and includes, a first generation unit generating a first circumference tangent to a line passing though the initial position and extending along a forward direction of the vehicle, and a second generation unit generating a second circumference having a tangent line passing through a rear position of the vehicle at a rear direction of the target parking position in the forward direction and extending along the forward direction, and having a radius of minimum turning of the vehicle, a part of the first circumference functions as a part of the route, and a part of a third circumference functions as the route subsequent to the first circumference.

7 Claims, 13 Drawing Sheets

(51) Int. Cl.
  *G01C 21/34* (2006.01)
  *G01C 21/36* (2006.01)
(52) U.S. Cl.
  CPC ..... *B62D 15/0285* (2013.01); *G01C 21/3407* (2013.01); *G01C 21/3629* (2013.01); *G01C 21/3647* (2013.01)
(58) Field of Classification Search
  CPC ...... G01C 21/3658; G08G 1/16; G08G 1/087; G08G 1/0965; G08G 5/04
  USPC ........................................ 701/23, 25, 1, 408
  See application file for complete search history.

(56) References Cited

U.S. PATENT DOCUMENTS

| | | | |
|---|---|---|---|
| 7,469,765 B2 | 12/2008 | Spannheimer et al. | |
| 8,229,645 B2* | 7/2012 | Lee | B62D 15/0285 340/937 |
| 8,825,262 B2* | 9/2014 | Lee | B62D 15/0285 701/25 |
| 9,738,315 B2* | 8/2017 | Yoon | B60R 1/00 |
| 9,884,646 B2* | 2/2018 | Tomozawa | B62D 15/0285 |
| 2009/0157260 A1* | 6/2009 | Lee | B62D 15/0285 701/41 |
| 2009/0251334 A1* | 10/2009 | Yoshihashi | B60W 50/14 340/932.2 |
| 2013/0151060 A1* | 6/2013 | Lee | B62D 15/0285 701/25 |
| 2015/0025732 A1* | 1/2015 | Min | B62D 15/0285 701/23 |
| 2015/0258989 A1* | 9/2015 | Okano | H04N 7/18 701/1 |
| 2016/0078766 A1* | 3/2016 | Kiyokawa | B62D 15/0285 340/932.2 |
| 2016/0280263 A1* | 9/2016 | Mori | B62D 15/027 |
| 2017/0015312 A1* | 1/2017 | Latotzki | B60W 30/06 |
| 2017/0032680 A1* | 2/2017 | Imai | G08G 1/168 |
| 2017/0032681 A1* | 2/2017 | Tomozawa | G08G 1/168 |
| 2017/0259812 A1* | 9/2017 | Tomozawa | B60W 30/06 |
| 2017/0259847 A1* | 9/2017 | Fukukawa | B62D 6/002 |

\* cited by examiner

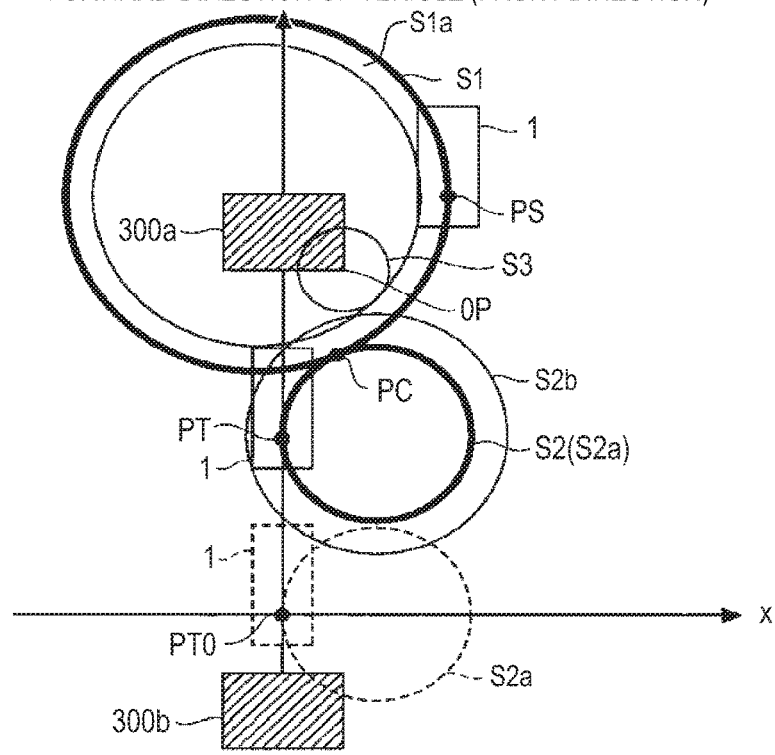
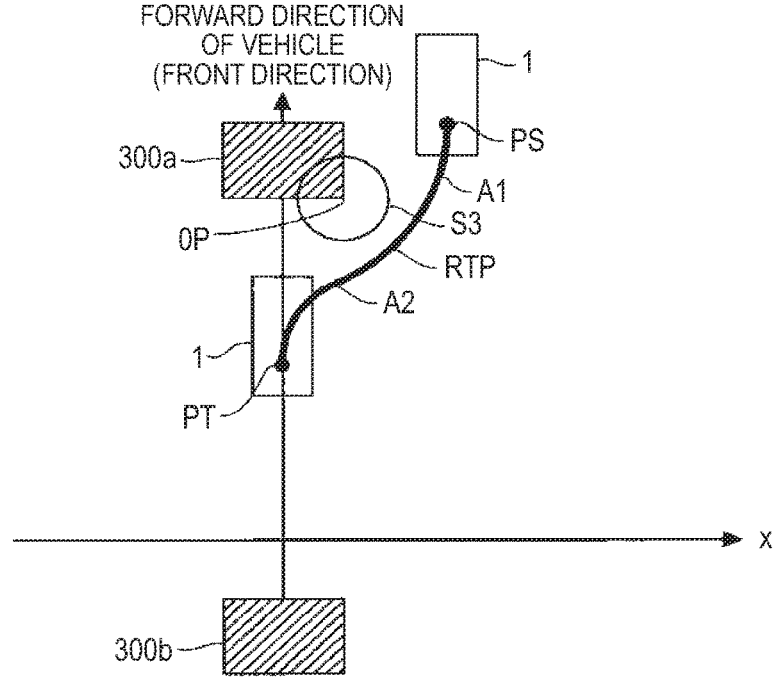

PARKING ASSISTANCE DEVICE

CROSS REFERENCE TO RELATED APPLICATIONS

This application is based on and claims priority under 35 U.S.C. § 119 to Japanese Patent Application 2015-152504, filed on Jul. 31, 2015, the entire contents of which are incorporated herein by reference.

TECHNICAL FIELD

This disclosure relates to a parking assistance device.

BACKGROUND DISCUSSION

A parking assistance device is known, which determines a movement route of a vehicle for parking positioned on a road for parallel parking. In some cases in such a device, a front end of a vehicle in the rear direction in a parking area is detected by a sensor, and a targeted parking position is set at a front side away from the front end of the vehicle in the rear direction by an avoidance distance set in advance.

JP2006-508850T (Reference 1) is an example of the related art.

However, in the device described above, in a case where the position of the vehicle in the rear direction is erroneously detected due to an error or the like of the sensor, there is a problem in that the vehicle moving along the movement route comes in contact with the vehicle in the rear direction.

SUMMARY

Thus, a need exists for a parking assistance device which is not suspectable to the drawback mentioned above.

A parking assistance device according to an aspect of this disclosure includes: a route determination unit that determines a route from an initial position of a vehicle to a target parking position at a time of assisting the vehicle to be parked in a parking area. The route determination unit includes; a first generation unit that generates a first circumference which is tangent to a straight line passing though the initial position and extends along a forward direction of the vehicle, and a second generation unit that generates a second circumference having a tangent line which is a line passing through a rear position of the vehicle positioned at a rear direction of the target parking position in the forward direction of the vehicle and extending along the forward direction of the vehicle, and having a radius as a turning radius at the time of minimum turning of the vehicle. A part of the first circumference functions as a part of the route. A part of a third circumference resulting from moving the second circumference along the forward direction of the vehicle functions as a route subsequent to the first circumference.

BRIEF DESCRIPTION OF THE DRAWINGS

The foregoing and additional features and characteristics of this disclosure will become more apparent from the following detailed description considered with the reference to the accompanying drawings, wherein:

FIG. 11 is a diagram describing a determination of the movement route in a case where the second circle is tangent to the first circle;

FIG. 12 is a diagram describing the determined movement route;

DETAILED DESCRIPTION

Some configuration elements included in exemplary embodiments and modification examples described below may be similar to each other. Accordingly, in the description below, the same reference signs will be given to the similar configuration elements, and the description thereof will be partially omitted. A portion included in an embodiment or a modification example can be replaced by a portion corresponding to other embodiments or the modification examples. In addition, a configuration or a position of a portion included in an embodiment or a modification example is similar to that in other embodiments or the modification examples unless otherwise stated.

A vehicle 1 in the present embodiment may be, for example, an automobile of which a drive source is an internal combustion engine (not illustrated), that is, an internal combustion engine vehicle, may be an automobile of which the drive source is an electric motor (not illustrated), that is, an electric vehicle, a fuel-cell vehicle or the like, may be a hybrid vehicle of which the drive source is both the internal combustion engine and the electric motor, or may be a vehicle having another drive source. In addition, the vehicle 1 can mount various transmissions, or can mount various devices such as a system or components necessary for driving the internal combustion engine and the electric motor. In addition, a method, the number, and a layout of a device relating to driving of vehicle wheels 3 of the vehicle 1 can be variously set.

Figure 1:
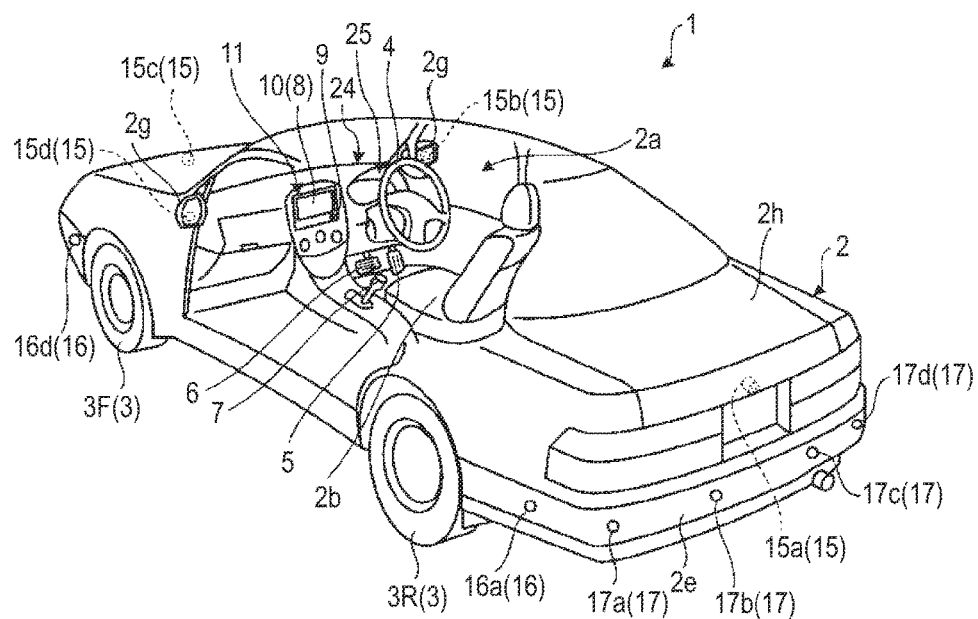
FIG. 1 is an exemplary perspective view illustrating a state in which a part of a passenger compartment of a vehicle in an embodiment is seen.

FIG. 1 is an exemplary perspective view illustrating a state in which a part of a passenger compartment of a vehicle is seen in perspective in the embodiment.

Figure 2:
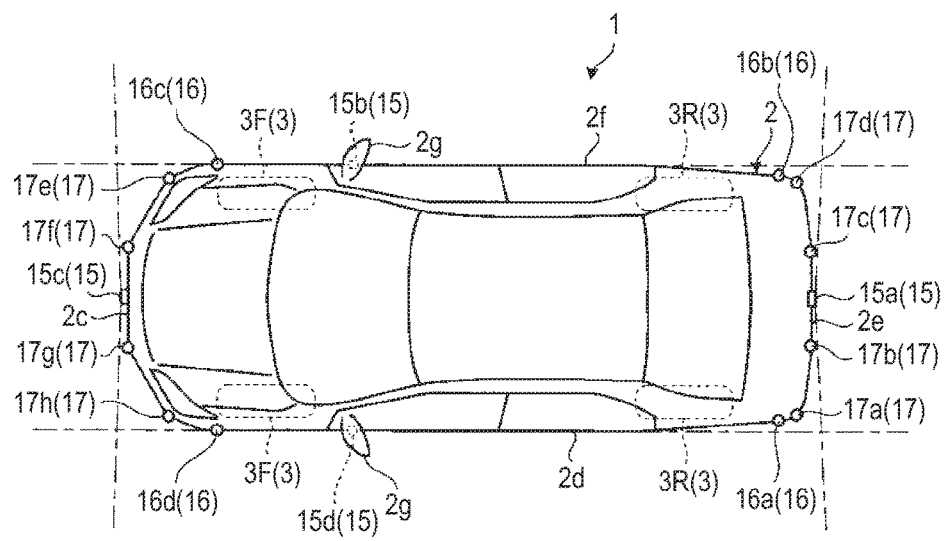
FIG. 2 is an exemplary plan view (overhead view) illustrating the vehicle in the embodiment.

FIG. 2 is an exemplary plan view (overhead view) illustrating the vehicle in the embodiment.

As illustrated in FIG. 1, a vehicle body 2 configures a passenger compartment 2a in which occupants (not illustrated) are seated. In the passenger compartment 2a, a steering section 4, an acceleration operation section 5, a brake operation section 6, and a shift operation section 7 are provided in a state of facing a seat 2b of a driver as the occupants.

The steering section 4 is, for example, a steering wheel protruded from a dashboard 24, the acceleration operation section 5 is, for example, an accelerator pedal positioned under a foot of the driver, the brake operation section 6 is, for example, a brake pedal positioned under the foot of the driver, and the shift operation section 7 is, for example, a shift lever protruding from a center console. The steering section 4, the acceleration operation section 5, the brake operation section 6, and the shift operation section 7 are not limited to those described above.

In addition, a display device 8 as a display output unit and a voice output device 9 as a voice output unit are provided in the passenger compartment 2a. The display device 8 is, for example, a liquid crystal display (LCD), an organic electro luminescent display (OELD), or the like. The voice output device 9 is, for example, a speaker. In addition, the display device 8 is covered by a transparent operation input unit 10 such as a touch panel. The occupants can visually recognize an image displayed on a display screen of the display device 8 via the operation input unit 10. In addition, the occupants can execute an operation input by operations such as touching, pressing or moving the operation input unit 10 by a finger on a position corresponding to the image displayed on the display screen of the display device 8. The display device 8, the voice output device 9, and the operation input unit 10 are provided on a monitor device 11 positioned on the dashboard 24 at a center portion in a vehicle width direction, that is, a horizontal direction. The monitor device 11 can include an operation input unit (not illustrated) such as a switch, a dial, a joystick, or a press button. In addition, a voice output device (not illustrated) can be provided at another position in the passenger compartment 2a that is different from the position of the monitor device 11. The voice can be output from another voice output device and the voice output device 9 of the monitor device 11. The monitor device 11 is also used as, for example, a navigation system or an audio system.

A display device 12 which is different from the display device 8 is provided in the passenger compartment 2a.

Figure 3:
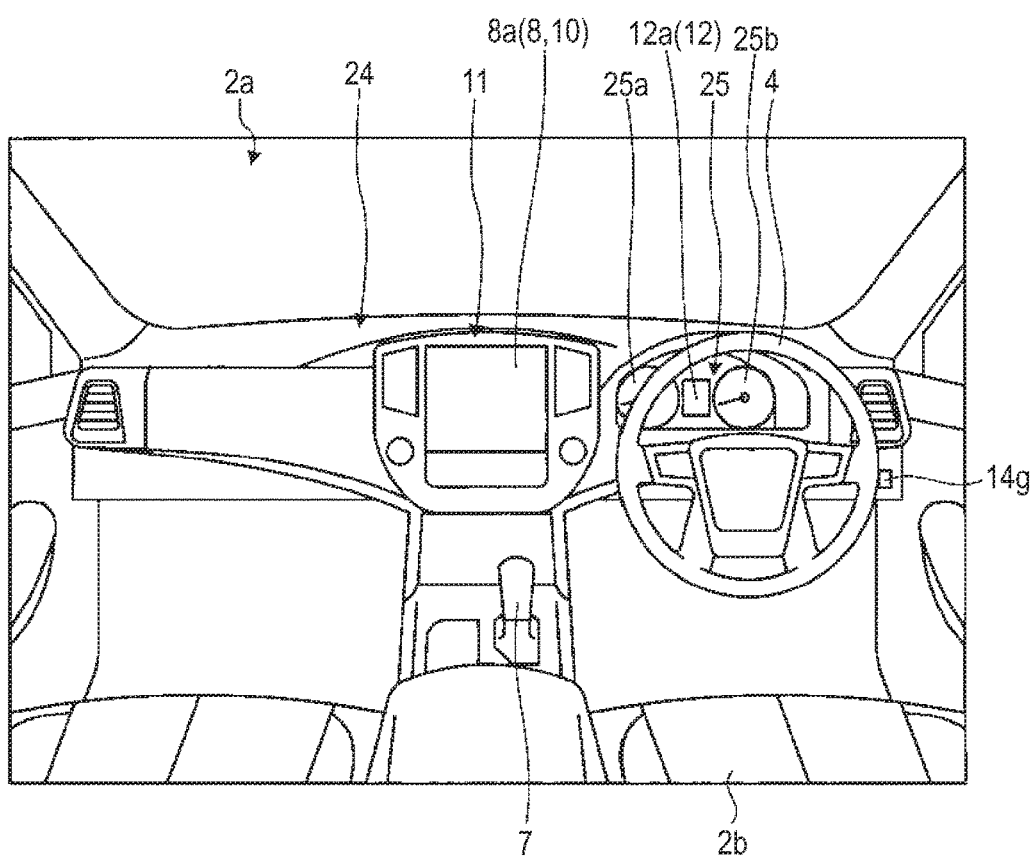
FIG. 3 is a diagram illustrating an example of a dashboard of the vehicle in the embodiment seen from a rear side of the vehicle.

FIG. 3 is a diagram illustrating an example of a dashboard of the vehicle seen from a rear side of the vehicle.

As illustrated in FIG. 3, the display device 12 is provided, for example, on an instrument panel section 25 of the dashboard 24, and is positioned between a speed display section 25a and a rotational speed display section 25b at the substantially center of the instrument panel section 25. A size of a screen 12a of the display device 12 is smaller than a size of a screen 8a of the display device 8. An image indicating information relating to the parking assistance of the vehicle 1 is mainly displayed on this display device 12. An amount of information displayed on the display device 12 may be smaller than an amount of information displayed on the display device 8. The display device 12 is, for example, the LCD or the OELD. The information displayed on the display device 12 may be displayed on the display device 8.

In addition, as illustrated in FIG. 1 and FIG. 2, the vehicle 1 is a four wheel vehicle, and includes right and left front wheels 3F and right and left rear wheels 3R. Any of these four vehicle wheels 3 are configured so as to be steered.

Figure 4:
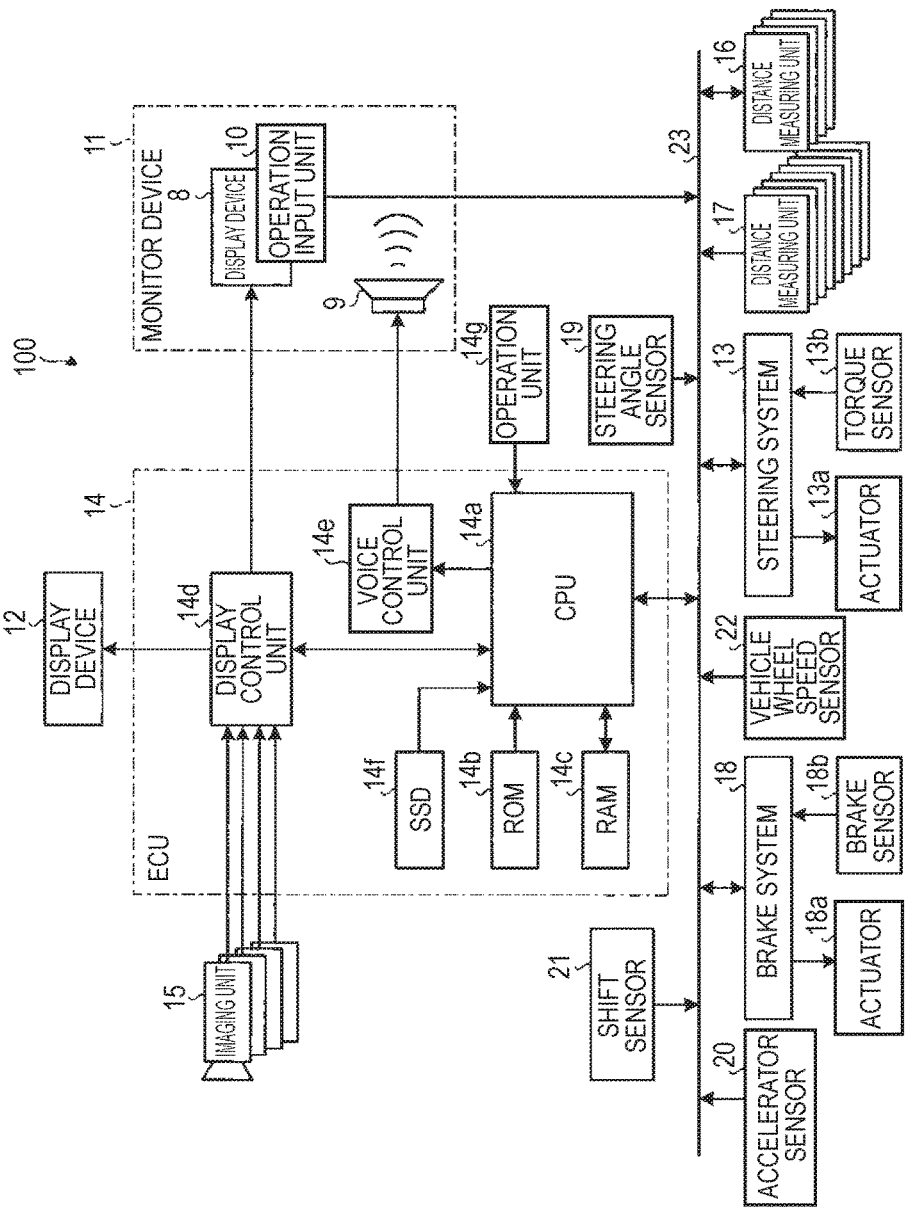
FIG. 4 is an exemplary block diagram illustrating a configuration of a parking assistance system in the embodiment.

FIG. 4 is an exemplary block diagram illustrating a configuration of a parking assistance system in the embodiment.

As illustrated in FIG. 4, the vehicle 1 includes a steering system 13 that steers at least two vehicle wheels 3. The steering system 13 includes an actuator 13a and a torque sensor 13b. The steering system 13 is electrically controlled by an electronic control unit (ECU) 14 or the like, and operates the actuator 13a. The steering system 13 is, for example, an electric power steering system, a steer by wire (SBW) system, or the like. The steering system 13 supplements a steering force by adding torque, that is, assisted torque to the steering section 4 using the actuator 13a or steers the vehicle wheels 3 using the actuator 13a. In this case, the actuator 13a may steer one vehicle wheel 3 or may steer a plurality of vehicle wheels 3. In addition, the torque sensor 13b detects, for example, a torque applied to the steering section 4 from the driver.

In addition, as illustrated in FIG. 2, for example, four imaging units 15a to 15d are provided on the vehicle body 2 as a plurality of imaging units 15. The imaging unit 15 is a digital camera in which an imaging element such as a charge coupled device (CCD) or a CMOS image sensor (CIS) is incorporated. The imaging unit 15 can output moving picture data in a predetermined frame rate. The imaging unit 15 respectively includes a wide-angle lens and a fish-eye lens and can image a range of, for example, 140° to 190° in the horizontal direction. In addition, an optical axis of the imaging unit 15 is set obliquely downward. Accordingly, the imaging unit 15 sequentially images an external environment around the vehicle body 2 including a road surface where the vehicle 1 can move or an area where the vehicle 1 can park, and outputs the image as imaged image data.

The imaging unit 15a is positioned, for example, at an end portion 2e on the rear side of the vehicle body 2 and is provided on a wall portion at a lower side of a door 2h of a rear trunk. The imaging unit 15b is positioned, for example, at an end portion 2f on the right side of the vehicle body 2 and is provided on a right side rear view mirror 2g. The imaging unit 15c is positioned, for example, at an end portion 2c on the front side, that is, the front side in the longitudinal direction of the vehicle body 2 and is provided on a front bumper or the like. The imaging unit 15d is positioned, for example, at an end portion 2d on the left side, that is, the left side in the vehicle width direction of the vehicle body 2 and is provided on a rear view mirror 2g as a left side protrusion portion. The ECU 14 executes calculation processing and image processing based on the image data obtained from the plurality of imaging units 15, and then, can generate an image of a wide viewing angle or generate a virtual bird's-eye view image viewed from above the vehicle 1. The bird's-eye view image is referred to as a plane image.

In addition, the ECU 14 identifies partition lines or the like indicated on the road surface around the vehicle 1 from the image imaged by the imaging unit 15, and detects (extracts) a parking section indicated by the partition lines.

In addition, as illustrated in FIG. 1 and FIG. 2, for example, four distance measuring units 16a to 16d and eight distance measuring units 17a to 17h are provided on the vehicle body 2 as a plurality of distance measuring units 16 and 17. The distance measuring units 16 and 17 are, for example, sonar items that emit ultrasonic wave and catch reflected wave. The sonar is also referred to as a sonar sensor, or an ultrasonic detector. The ECU 14 can identify the presence of the object such as the obstacle or the like positioned around the vehicle 1 and can measure the distance to the object according to the result of detection by the distance measuring units 16 and 17. That is, the distance measuring units 16 and 17 are examples of the detection units that detect the object. The distance measuring unit 17 is used for detecting, for example, an object of relatively short distance, and the distance measuring unit 16 is used for detecting, for example, an object of relatively longer distance than that detected by the distance measuring unit 17. In addition, the distance measuring unit 17 is used for detecting an object at the front and rear of the vehicle 1, and the distance measuring unit 16 is used for detecting an object at the sides of the vehicle 1.

In addition, as illustrated in FIG. 4, in a parking assistance system 100, a brake system 18, a steering angle sensor 19, an accelerator sensor 20, a shift sensor 21, and a vehicle wheel speed sensor 22 are electrically connected to each other via an in-vehicle network 23 as a telecommunication line in addition to the ECU 14, the monitor device 11, the steering system 13, and the distance measuring units 16 and 17.

The in-vehicle network 23 is configured, for example, as a controller area network (CAN). The ECU 14 can control the steering system 13, brake system 18, or the like by sending a control signal via the in-vehicle network 23. In addition, the ECU 14 can receive the result of detection by the torque sensor 13b, the brake sensor 18b, the steering angle sensor 19, the distance measuring unit 16, the distance measuring unit 17, the accelerator sensor 20, the shift sensor 21, the vehicle wheel speed sensor 22, and the like, or an operation signal of the operation input unit 10 via the in-vehicle network 23.

The ECU 14 includes, for example, a central processing unit (CPU) 14a, a read only memory (ROM) 14b, a random access memory (RAM) 14c, a display control unit 14d, a voice control unit 14e, a solid state drive (SSD) 14f (flash memory), or the like. The CPU 14a can execute various calculation processing and control such as image processing relating to the image displayed on the display devices 8 and 12, determination of a target movement and parking position of the vehicle 1, calculation of a movement route of the vehicle 1, determination of a presence or absence of the interference with the object, an automatic control of the vehicle 1, and release of the automatic control. The CPU 14a can read out a program installed and stored in a non-volatile storage device such as the ROM 14b, and can execute the calculation processing according to the program. The RAM 14c temporarily stores various data used for the calculation by the CPU 14a. In addition, the display control unit 14d mainly executes the image processing using the image data obtained by the imaging unit 15 and the composition of the image data to be displayed on the display device 8 among the calculation processing items in the ECU 14. In addition, the voice control unit 14e mainly executes processing of the voice data output from the voice output device 9 among the calculation processing items in the ECU 14. In addition, the SSD 14f is a rewritable non-volatile storage unit, and can store data even in a case where the power of the ECU 14 is turned off. The CPU 14a, ROM 14b, RAM 14c, and like may be integrated in one package. In addition, the ECU 14 may be configured to use another logical operation processor or a logic circuit such as a digital signal processor (DSP) instead of the CPU 14a. In addition, a hard disk drive (HDD) may be provided instead of the SSD 14f, and the SSD 14f and the HDD may be provided separately from the ECU 14.

The brake system 18 is, for example, an anti-lock brake system (ABS) that suppresses a locking of the brake, an electronic stability control (ESC) that suppresses skidding of the vehicle 1 at the time of cornering, an electric brake system that enhances the braking force (executes a braking assist), a brake by wire (BBW), and the like. The brake system 18 gives a braking force to the vehicle wheels 3, and eventually to the vehicle 1 via the actuator 18a. In addition, the brake system 18 can detect a locking of the brake, idling of the vehicle wheels 3, or signs of skidding from the rotation difference between the right and left vehicle wheels 3, and can execute various controls. A brake sensor 18b is, for example, a sensor that detects a position of a movable portion of the brake operation section 6. The brake sensor 18b can detect the position of the brake pedal as the movable portion of the brake operation section 6. The brake sensor 18b includes a displacement sensor.

The steering angle sensor 19 is a sensor that detects an amount of steering of the steering section 4 such as the steering wheel. The steering angle sensor 19 is configured using, for example, a hall element or the like. The ECU 14 acquires the amount of steering of the steering section 4 by the driver or an amount of steering of each vehicle wheel 3 in a case of automatic steering from the steering angle sensor 19, and executes various controls. The steering angle sensor 19 detects a rotation angle of a rotating part included in the steering section 4. The steering angle sensor 19 is an example of an angle sensor.

The accelerator sensor 20 is, for example, a sensor that detects a position of a movable portion of the acceleration operation section 5. The accelerator sensor 20 can detect the position of the accelerator pedal as the movable portion. The accelerator sensor 20 includes a displacement sensor.

The shift sensor 21 is, for example, a sensor that detects a position of a movable portion of the shift operation section 7. The shift sensor 21 can detect a position of a lever, an arm, a button, or the like as the movable portion of the shift operation section 7. The shift sensor 21 may include a displacement sensor or may be configured as a switch.

The vehicle wheel speed sensor 22 is a sensor that detects an amount of rotation or the number of rotations of the vehicle wheels 3 per unit time. The vehicle wheel speed sensor 22 outputs the number of the vehicle wheel speed pulses indicating the detected number of rotations as a sensor value. The vehicle wheel speed sensor 22 may be configured using, for example, the hall element or the like. The ECU 14 calculates an amount of movement of the vehicle 1 based on the sensor value acquired from the vehicle wheel speed sensor 22, and executes various controls. In some cases, the vehicle wheel speed sensor 22 is provided on the brake system 18. In this case, the ECU 14 acquires the result of detection by the vehicle wheel speed sensor 22 via the brake system 18.

The configuration, the arrangement, the electrical connection form of various sensors and the actuator described above are just examples, and can be variously set (changed).

In the present embodiment, the ECU 14 realizes at least part of the functions as the parking assistance device by co-working of hardware and software (a control program).

Figure 5:
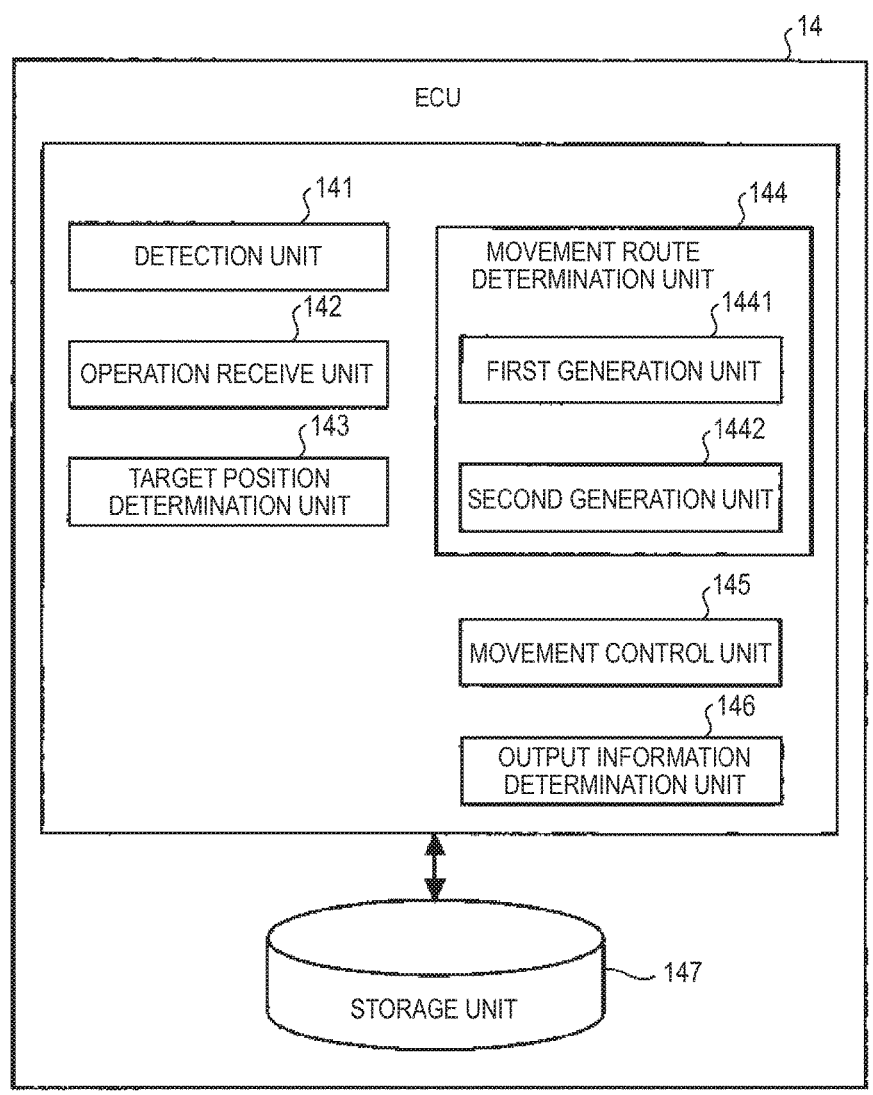
FIG. 5 is a functional configuration block diagram of an ECU.

FIG. 5 is a functional configuration block diagram of the ECU 14.

As illustrated in FIG. 5, the ECU 14 functions as a detection unit 141, an operation receive unit 142, a target position determination unit 143, a movement route determination unit 144, a movement control unit 145, an output information determination unit 146 and a storage unit 147.

In the configuration described above, the detection unit 141 detects obstacles such as another vehicle or a column, or a border line such as a parking stall line.

The operation receive unit 142 acquires an operation signal by the operation input of an operation unit 14g. Here, the operation unit 14g is configured from, for example, a push button, a switch or the like, and outputs the operation signal.

The target position determination unit 143 determines the target movement and parking position (target parking position) of the vehicle 1.

The movement route determination unit 144 determines the movement route from the initial position of the vehicle 1 to the target movement and parking position at the time of the parking assistance of the vehicle 1 to a parking available area 201. In the present embodiment, the movement route determination unit 144 generates two circles and determines the movement route. As illustrated in FIG. 5, the movement route determination unit 144 includes a first generation unit 1441 and a second generation unit 1442.

The first generation unit 1441 generates a circumference (a first circumference) of a first circle which is tangent to a straight line that passes through the initial position of the vehicle 1 and extends along the forward direction of the vehicle 1. The circumference of the first circle functions as a part of the movement route. The second generation unit 1442 generates a circumference (a second circumference) of a second circle with a straight line that passes through a rear position located at the rear of the target position of the vehicle 1 in the forward direction of the vehicle 1 and extends along the forward direction of the vehicle 1 as a tangent line, and with a turning radius at the time of the minimum turning of the vehicle 1 as a radius. A circumference of a third circle (a third circumference) resulting from moving the circumference of the second circle along the forward direction of the vehicle 1 functions as the movement route subsequent to the first circumference.

The movement control unit 145 (a control unit) controls each unit of the vehicle 1 such that the vehicle 1 moves to the target movement and parking position (target parking position) along the movement route.

The output information determination unit 146 determines information items output from the display devices 12, 8 and the voice output device 9, and an output aspect of the information items.

The storage unit 147 stores data used in calculation in the ECU 14 or data items calculated by the calculation in the ECU 14.

Figure 6:
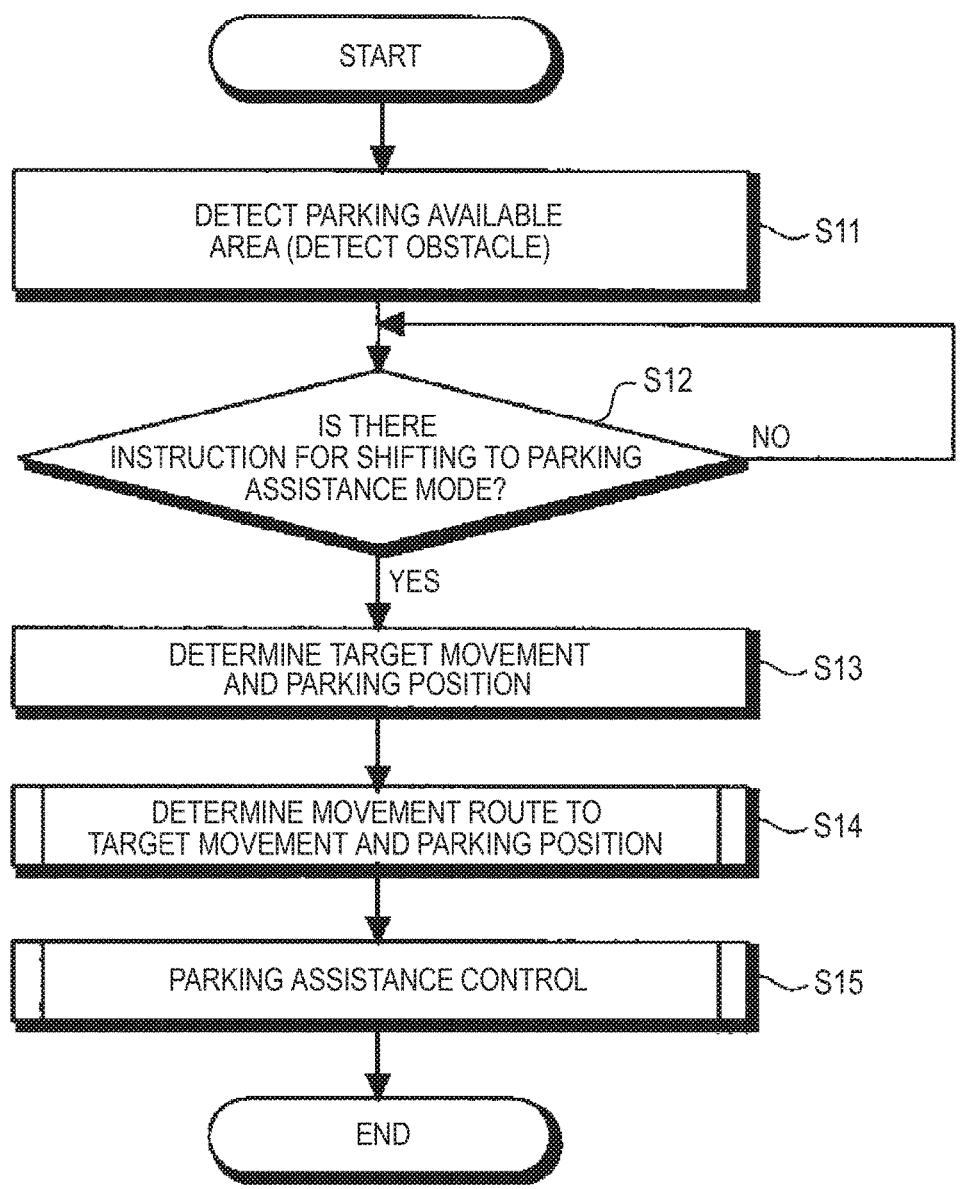
FIG. 6 is a flowchart illustrating an overview of processing in the embodiment.
Figure 7:
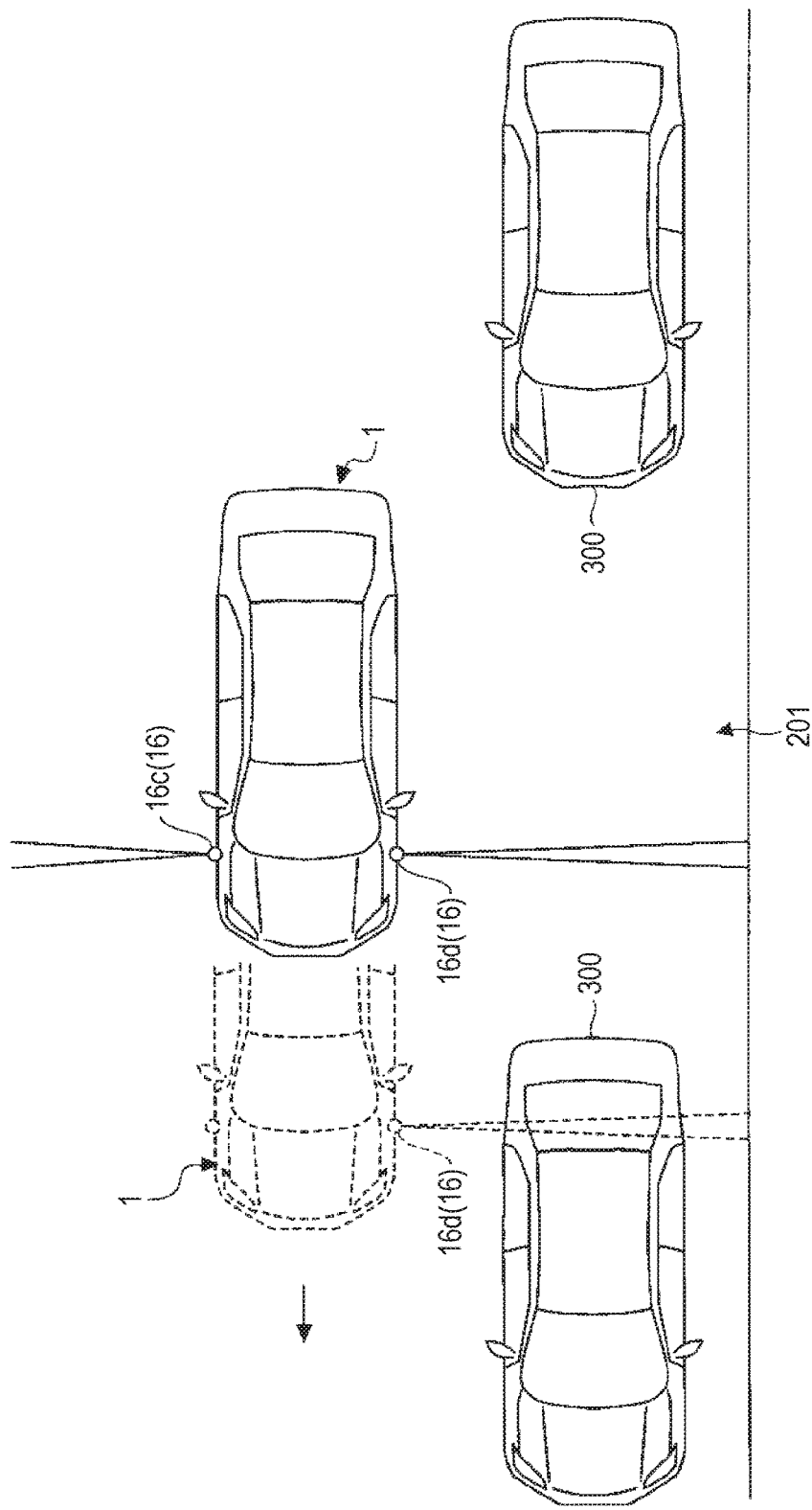
FIG. 7 is a diagram describing a detection of a parking available area.

Next, operations in the embodiment will be described. FIG. 6 is a flowchart illustrating an overview of processing in the embodiment. First, the ECU 14 performs the detection of the parking available area (detection of the obstacle) (STEP S11). FIG. 7 is a diagram describing the detection of the parking available area. Specifically, the distance measuring units 16c and 16d calculate the distance to the obstacle such as another vehicle 300 for each predetermined sampling timing, and output the calculation result as data corresponding to the reflected portion (a set of the reflection points of the sound wave or the like) of the obstacle. The output data is stored, for example, in the RAM 14c for each output period.

Then, the ECU 14 functions as the detection unit 141 and detects the parking available area 201 positioned at the side direction of the vehicle 1 based on the output data from the distance measuring unit 16d. Specifically, in a case where the output data is output, which corresponds to the case where the output data corresponding to the obstacle is output for a period of equal to or longer than a period corresponding to a first predetermined length, and thereafter, the obstacle is not present for a period of equal to or longer than a second predetermined period corresponding to a minimum width required for the parking available area for the vehicle 1 (including a case where the distance to the obstacle is equal to or longer than the vehicle length in the longitudinal direction of the vehicle required for the parking of the vehicle 1), the detection unit 141 determines that the parking available area 201 is present.

In addition, the detection unit 141 can detect the parking available area 201 by performing edge extraction using image data of the parking stall lines such as white lines provided on the travelling surface such as a ground surface or a road surface based on the image data output from the imaging unit 15d that images the left side direction of the vehicle 1.

Subsequently, the ECU 14 functions as the operation receive unit 142, and determines whether or not there is an instruction for shifting the mode to the parking assistance mode via the operation unit 14g (STEP S12).

In the determination in STEP S12, in a case where there is no instruction for shifting the mode to the parking assistance mode yet via the operation unit 14g (No in STEP S12), the process remains in a standby state.

In the determination in STEP S12, in a case where there is an instruction for shifting the mode to the parking assistance mode via the operation unit 14g (Yes in STEP S12), the ECU 14 functions as the target position determination unit 143, and determines the target movement and parking position (the target parking position) of the vehicle 1 (STEP S13). The target parking position which is an example of the rear position is set on the front position away from the front end portion of a parked vehicle 300b at the rear position to the forward direction of the vehicle 1 by an avoidance distance d. The avoidance distance d is a predetermined value set by the user or the like.

Subsequently, the ECU 14 functions as the movement route determination unit 144, and determines the movement route to the target movement and parking position of the vehicle 1 (STEP S14).

Figure 8:
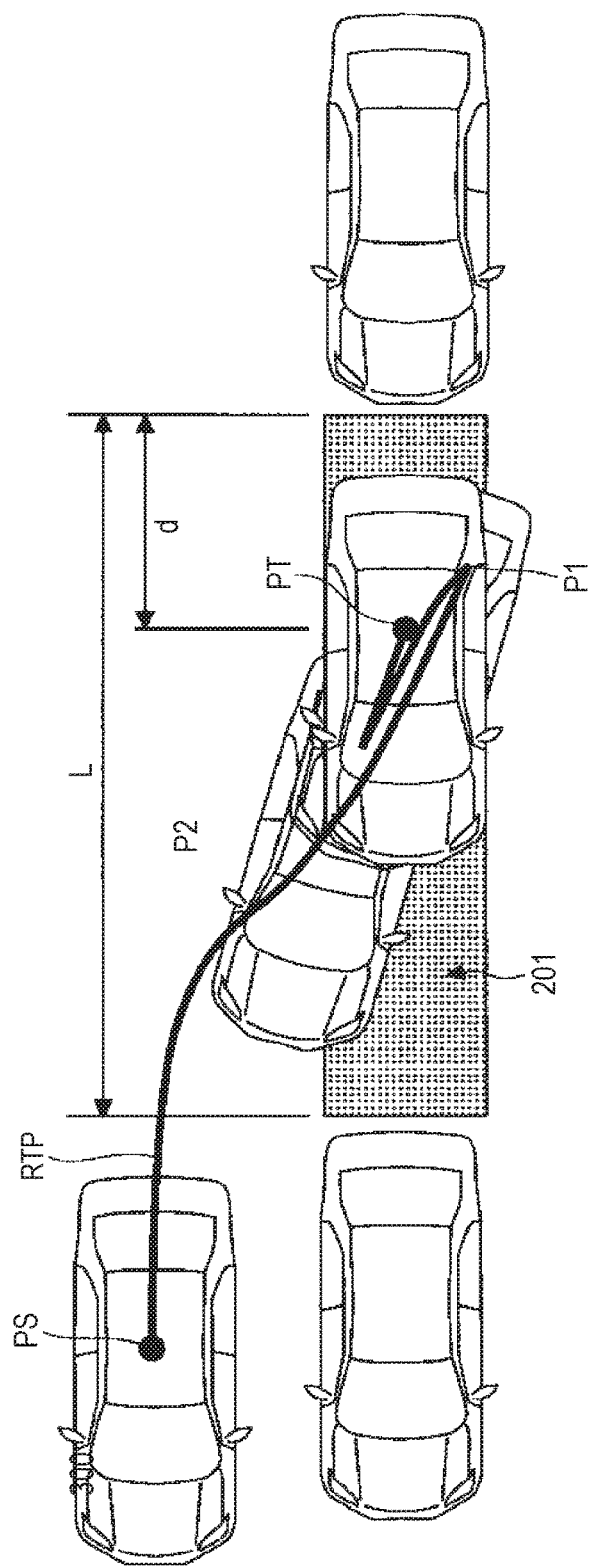
FIG. 8 is a diagram describing an example of setting a movement route.

FIG. 8 is a diagram describing an example of setting the movement route. A case of the movement route having two forward and backward turning positions P1 and P2 of the steering wheel as the steering section 4 is described in FIG. 8.

A movement route RTP in FIG. 8 is a route in which the vehicle 1 moves backward by turning the steering wheel as the steering section 4 to the left by a predetermined amount from an initial position PS of the vehicle 1 at the time of starting the parking assistance control processing to move toward the turning position P1 of the steering wheel as the steering section 4. Then, in the movement route RTP, the driver presses the brake pedal as the brake operation section 6 at the turning position P1 to stop the vehicle 1, changes the gear to "forward", and slightly turns the steering wheel as the steering section 4 to the right, and then, the vehicle 1 moves toward the turning position P2 of the steering wheel as the steering section 4. Then, in the movement route RTP, the driver presses the brake pedal as the brake operation section 6 at the turning position P2 to stop the vehicle 1, changes the gear to "backward", and then, the vehicle 1 moves toward a target parking position PT.

Here, in FIG. 8, L is a parking space length which is a width for the vehicle 1 to enter the parking available area 201. When detecting the parking available area 201, the detection unit 141 calculates the parking space length L.

Figure 9:
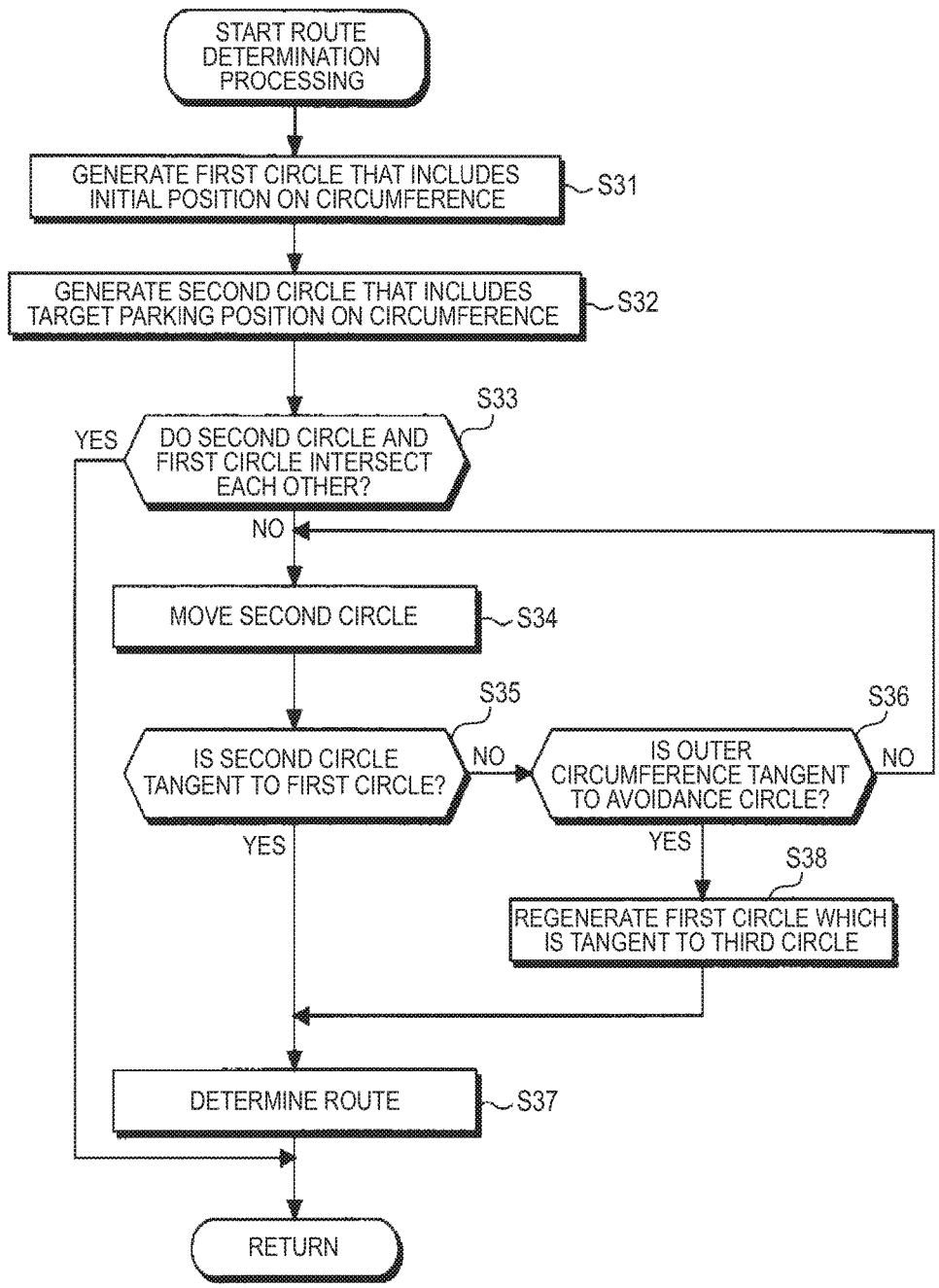
FIG. 9 is a flowchart illustrating a procedure of route determination processing in the present embodiment.

Moreover, in the present embodiment, the movement route RTP is determined as described below. FIG. 9 is a flowchart illustrating a procedure of route determination processing in the present embodiment.

The ECU 14 functions as the first generation unit 1441 of the movement route determination unit 144, and generates a first circle S1 that includes the initial position PS of the vehicle 1 on the circumference thereof (STEP S31). The initial position PS of the vehicle 1 is a position of the center of the rear wheel shaft of the vehicle 1 at the time of parking starting.

Figure 10:
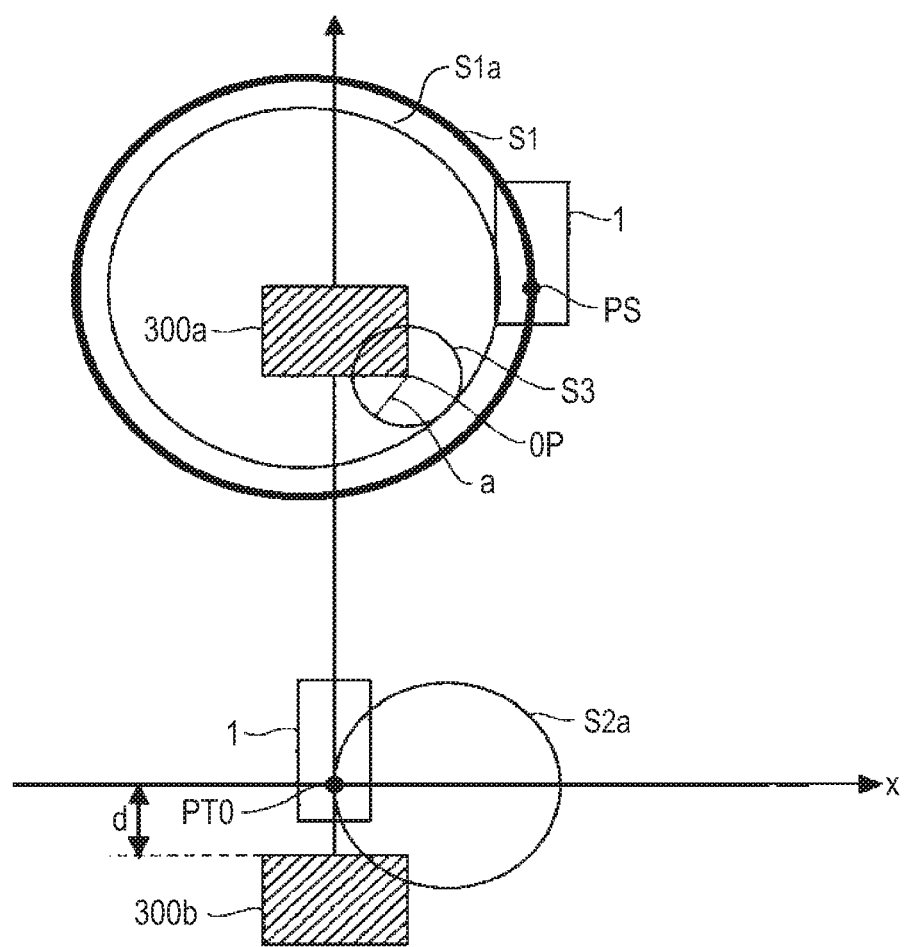
FIG. 10 is a diagram illustrating a first circle and a second circle in determining a route in the present embodiment.

FIG. 10 is a diagram illustrating the first circle and the second circle in determining the route in the present embodiment. A parked vehicle parked in the front direction of the parking available area and a parked vehicle parked in the rear direction of the parking available area are schematically illustrated in FIG. 10 with reference signs 300a and 300b respectively. In FIG. 10, a corner of the rear portion (rear corner) of the parked vehicle 300a in the front direction at the initial position PS side is illustrated with a reference sign OP.

First, the ECU 14 generates the first circle S1 in which an inner circumference circle S1a is tangent to an avoidance circle S3. The inner circumference circle S1a is a circle on which the end portion (in the example in FIG. 10, an inner end portion and the rear left end portion) of the vehicle 1 moving along the first circle S1 passes. The avoidance circle S3 is a circle having a center at a position of the rear corner OP (left rear end portion in the example in FIG. 10) which is an example of a corner portion of the parked vehicle 300a that is an example of an obstacle disposed in the front direction of the parking available area 201, and having a radius as an avoidance margin a which is an example of a predetermined distance. The rear end portion OP of the parked vehicle 300a in the front direction is an end portion nearest to the movement route among the end portions of the parked vehicle 300a. The radius of the inner circumference circle S1a is a value determined by the steering angle of the vehicle 1 in a case where the vehicle 1 moves along the first circle S1 and the length (vehicle length) of the vehicle 1 in the longitudinal direction.

Here, the avoidance margin a (the avoidance distance) is an example of a predetermined distance and is determined by the driver in advance. The avoidance margin a is a margin of a distance set for avoiding collision with the rear end portion OP of the parked vehicle 300a in the front direction.

The ECU 14 functions as the second generation unit 1442 of the movement route determination unit 144, and generates a second circle S2a that includes a rear position PT0 of the vehicle 1 on the circumference thereof (STEP S32). Specifically, the ECU 14 generates the second circle S2a having a line passing through the rear position PT0 and extending in the forward direction of the vehicle 1 at the rear position PT0 as a tangent line, and having a radius as a turning radius at the time of minimum turning. Here, the minimum turning means a case where the vehicle 1 turns with a maximum steering angle, and the minimum turning radius means a radius of an arc drawn by the center of the rear wheels shaft of the vehicle 1 at the time of the minimum turning. The turning radius of the center of the rear wheels shaft of the vehicle 1 at the time of minimum turning of the vehicle 1 is a known value determined in advance using the maximum steering angle of the vehicle 1 and the center position of the rear wheels shaft of the vehicle 1.

The ECU 14 determines whether or not the first circle S1 and the second circle S2a intersect each other (STEP S33). In a case where it is determined that the first circle S1 and the second circle S2a intersect each other (Yes in STEP S33), the ECU 14 ends the route determination processing. This is because the parked vehicle 300a in the front direction and the parked vehicle 300b in the rear direction are too close to each other and the parking available area 201 is narrow, and thus, the movement route RTP cannot be determined.

As illustrated in FIG. 10, in a case where it is determined that the first circle S1 and the second circle S2a do not intersect each other (No in STEP S33), the ECU 14 moves the second circle S2a along the forward direction (STEP S34). The forward direction here is the front direction of the vehicle 1.

The ECU 14 determines whether or not the second circle S2a is tangent to the first circle S1 due to the movement of the second circle S2a (STEP S35). In a case where it is determined that the second circle S2a is not tangent to the first circle S1 (No in STEP S35), the ECU 14 determines whether or not an outer circumference circle S2b on which the end portion (for example, an outer end portion) of the vehicle 1 moving along the second circle S2a passes through is tangent to the avoidance circle S3 (S36). A radius of the outer circumference circle S2b is a known value determined in advance using the maximum steering angle of the vehicle 1 and the length of the vehicle 1 (vehicle length) in the longitudinal direction. In a case where it is determined that the outer circumference circle S2b is not tangent to the avoidance circle S3 (No in S36), the ECU 14 repeats the process subsequent to STEP S34. In other words, the ECU 14 moves the second circle S2a along the forward direction until the second circle S2a becomes tangent to the first circle S1 or until the outer circumference circle S2b becomes tangent to the avoidance circle S3.

When the second circle S2a becomes tangent to the first circle S1 (Yes in STEP S35) before the outer circumference circle S2b becomes tangent to the avoidance circle S3, the ECU 14 determines the movement route RTP with the second circle S2a at that position as a third circle S2 (STEP S37).

FIG. 11 is a diagram describing the determination of the movement route RTP in a case where the second circle S2a is tangent to the first circle S1. FIG. 12 is a diagram describing the determined movement route RTP.

When the second circle S2a illustrated by a dotted line is moved along the forward direction and when the second circle S2a becomes tangent to the first circle S1 as illustrated in FIG. 11 before the outer circumference circle S2b becomes tangent to the avoidance circle S3, the ECU 14 sets the second circle S2a positioned at the position where the second circle S2a becomes tangent to the first circle S1 as the third circle S2. In this way, the ECU 14 generates the third circle S2 in which the outer circumference circle S2b is separated from the avoidance circle S3. Therefore, the vehicle 1 moving along the third circle S2 does not come in contact with the parked vehicle 300a in the front direction. The ECU 14 defines an arc from the initial position PS to a position PC where the first circle S1 is tangent to the third circle S2 on the first circle S1 as a first arc A1. The ECU 14 defines an arc from the position PC where the third circle S2 becomes tangent to the first circle S1 to the position target parking position PT on the third circle S2 as a third arc A2. Here, the target parking position PT is a position where the rear position PT0 is moved along the forward direction by as much as the same distance the second circle S2a is moved. The ECU 14 links the first arc A1 and the third arc A2 and determines the movement route RTP illustrated in FIG. 12.

Returning to FIG. 9, in a case where the outer circumference circle S2b becomes tangent to the avoidance circle S3 (Yes in STEP S36) before the second circle S2a becomes tangent to the first circle S1, the ECU 14 defines the second circle S2a at the position where the outer circumference circle S2b is tangent to the avoidance circle S3 as the third circle S2, and regenerates the first circle S1 that is tangent to the third circle S2 (STEP S38), and then, determines the movement route RTP (STEP S37).

Figure 13:
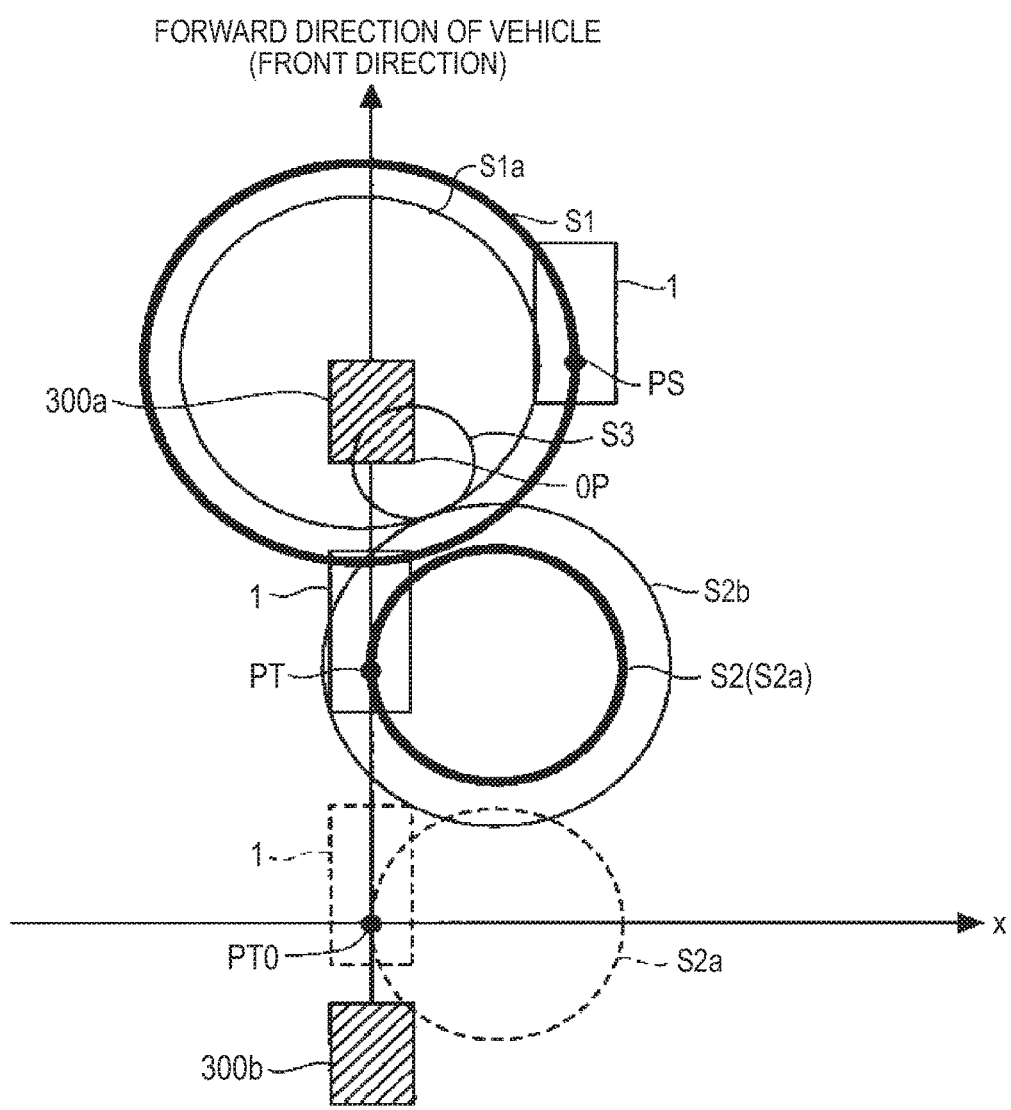
FIG. 13 is a diagram describing a determination of the movement route in a case where an outer circumference circle is tangent to an avoidance circle.
Figure 14:
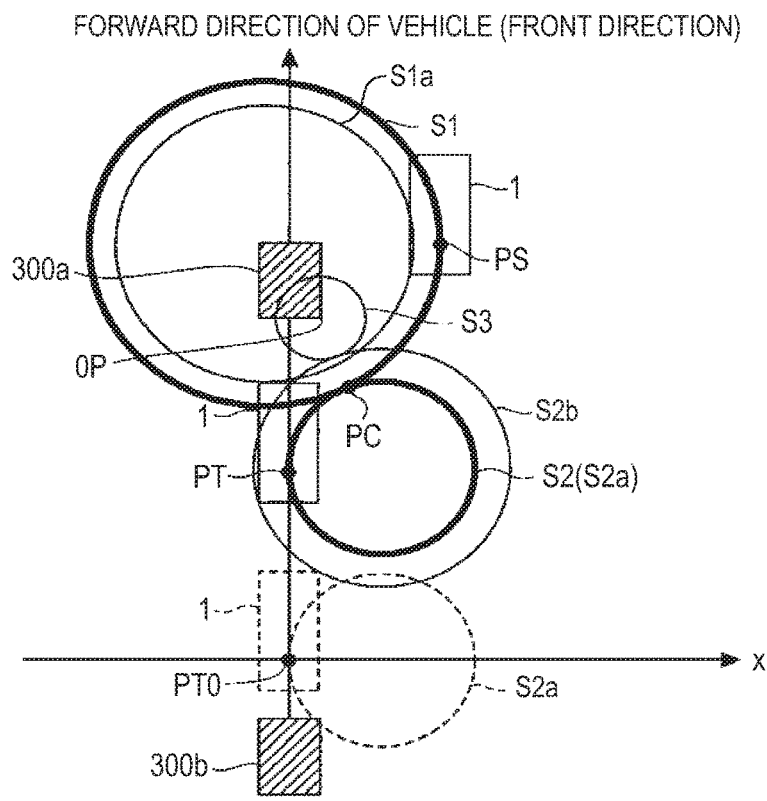
FIG. 14 is a diagram describing a regeneration of the first circle in a case where the outer circumference circle is tangent to the avoidance circle.
Figure 15:
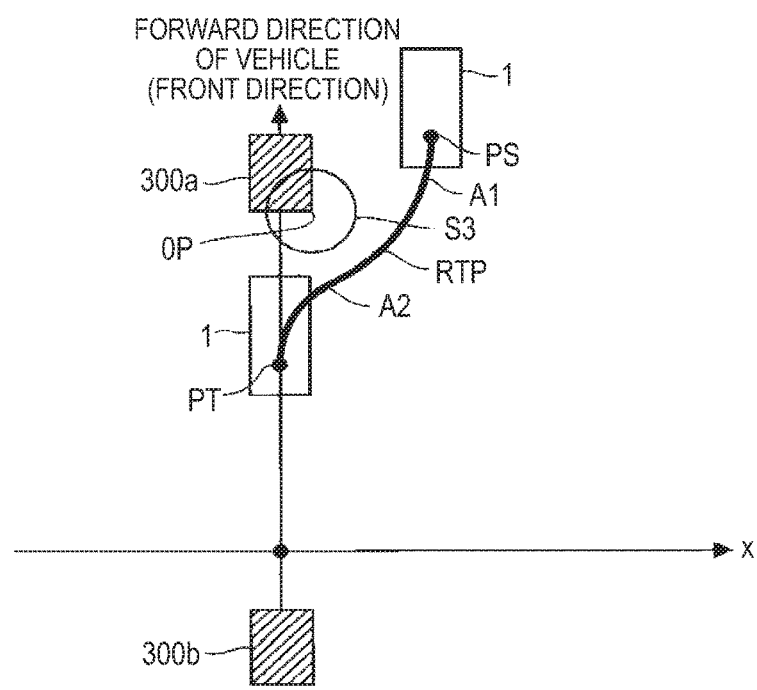
FIG. 15 is a diagram describing the determined movement route.

FIG. 13 is a diagram describing the determination of the movement route RTP in a case where the outer circumference circle S2b is tangent to the avoidance circle S3. FIG. 14 is a diagram describing the regeneration of the first circle S1 in a case where the outer circumference circle S2b is tangent to the avoidance circle S3. FIG. 15 is a diagram describing the determined movement route RIP.

When the second circle S2a illustrated by a dotted line is moved along the forward direction and when the outer circumference circle S2b becomes tangent to the avoidance circle S3 as illustrated in FIG. 13 before the second circle S2a becomes tangent to the first circle S1, the ECU 14 sets the second circle S2a at that position as the third circle S2. In this state, since the first circle S1 is not tangent to the third circle S2, the ECU 14 regenerates the first circle S1 that is tangent to the third circle S2 as illustrated in FIG. 14. Here, since the radius of the regenerated first circle S1 is longer than that of the original first circle S1, the radius of the inner circumference circle S1a also becomes long. In this way, the ECU 14 generates the first circle S1 in which the inner circumference circle S1a is separated from the avoidance circle S3. Therefore, the vehicle 1 moving along the first circle S1 does not come in contact with the parked vehicle 300a in the front direction.

The ECU 14 sets the arc from the initial position PS to the position PC where the regenerated first circle S1 becomes tangent to the third circle S2 as the first arc A1. The ECU 14 sets the arc from the position PC where the third circle S2 is tangent to the first circle S1 to the target parking position PT as the third arc A2. The ECU 14 links the first arc A1 and the third arc A2, and determines the movement route RTP illustrated in FIG. 15.

Returning to FIG. 6, when the movement route RTP is determined, the ECU 14 shifts the mode to the parking assistance mode (STEP S15).

Figure 16:
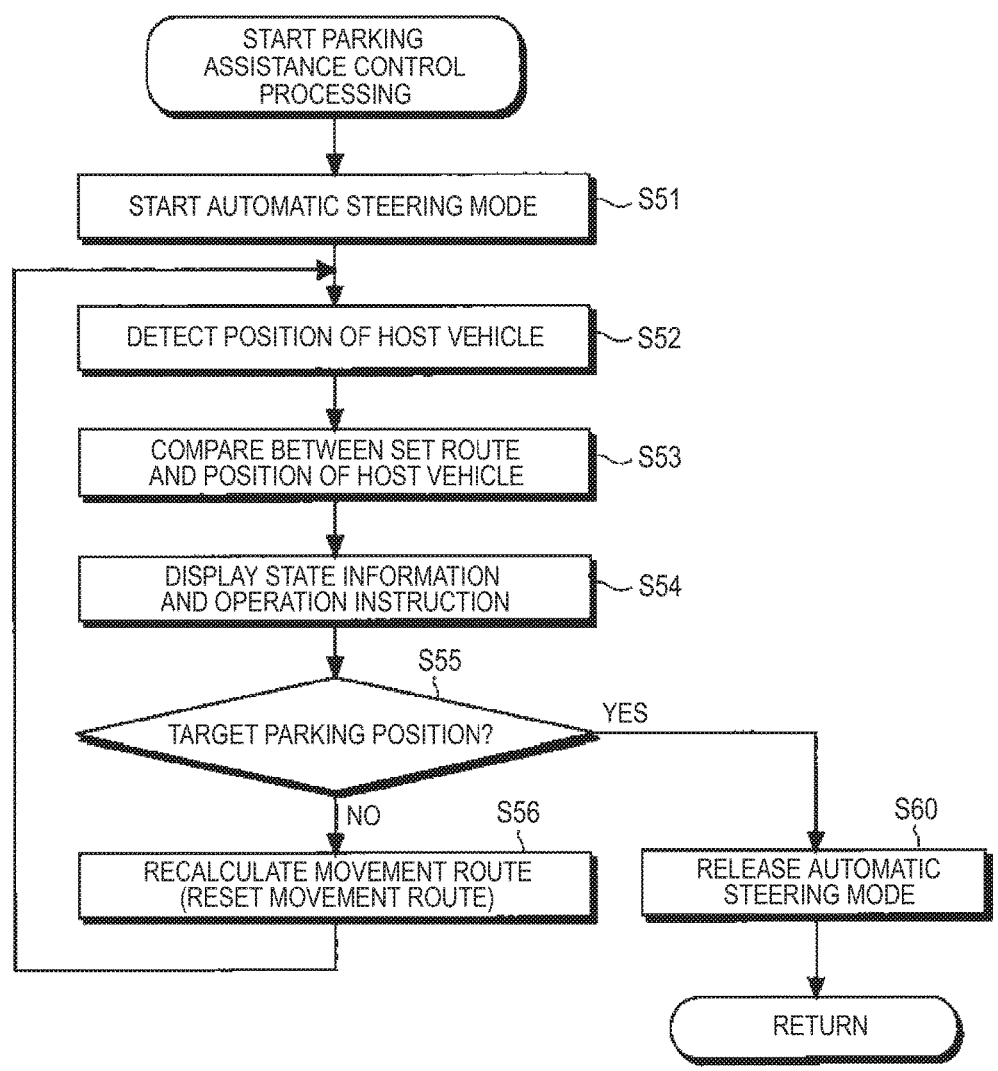
FIG. 16 is a flowchart of parking assistance control processing.

FIG. 16 is a flowchart of the parking assistance control processing. First, the ECU 14 functions as the movement control unit 145, and starts an automatic steering mode which performs automatic steering in order to control each unit of the vehicle 1 such that the vehicle 1 moves to the target parking position PT that is the target movement and parking position along the movement route (STEP S51).

In the automatic steering mode, it is not necessary for the driver to perform the operation of the steering section 4, specifically the operation of the steering wheel. In addition, creeping which is a transferred driving force of the engine is used as a forward driving force and a backward driving force of the vehicle 1 at the time of the parking assistance control processing, without performing the operation of pressing the accelerator pedal which is an operation by the acceleration operation section 5.

Therefore, the driver performs only the operation of the brake pedal as the brake operation section 6 and the operation of the shift lever as the shift operation section 7 in accordance with the display on the display device 12.

Subsequently, the movement control unit 145 detects the position of the host vehicle (STEP S52). Specifically, the detection of the host vehicle by the movement control unit 145 (ECU 14) is a detection by calculating the distance and direction that is the amount of movement from the initial position PS based on the amount of steering of the steering section 4 detected by the steering angle sensor 19 and the vehicle speed detected by the vehicle wheel speed sensor 22.

In this way, the ECU 14 performs a comparison between the set route and the position of the host vehicle (STEP S53), and determines the state information about the vehicle and the operation instruction to the driver as a function of the output information determination unit 146, and then, displays the state information and the operation instruction on the display device 12 (STEP S54).

Subsequently, the ECU 14 functions as the movement control unit 145 and determines whether or not the position of the host vehicle reaches the target parking position PT as the target position (STEP S55).

Then, in a case where the position of the host vehicle does not reach the target parking position PT as the target position yet (No in STEP S55), the ECU 14 functions as the movement route determination unit 144 again, and performs the recalculation of the movement route, and resets the movement route (STEP S56). Specifically, the procedure of route determination processing described using FIG. 9 is executed. This is to keep the most optimal movement route according to the actual situation because the vehicle 1 does not necessarily travel forward in accordance with the set movement route due to the road situations or the like.

Then, the ECU 14 returns the process to STEP S52 and repeats the similar processing thereafter.

In STEP S55, in a case where the position of the host vehicle reaches the target parking position PT as the target position (Yes in STEP S55), the movement control unit 145 releases the automatic steering mode (STEP S60), and the ECU 14 displays end of the parking assistance processing on an instruction display area (not illustrated) of the screen 12a on the display device 12 to end the parking assistance processing.

In the embodiment described above, the ECU 14 generates the movement route RTP as the third arc A2 on the third circle S2 which is the second circle S2a generated with the avoidance distance d as a reference being moved to the front direction. In this way, since the ECU 14 can determine the target parking position PT on the position where the rear position PT0 is moved to the front direction, it is possible to suppress the vehicle 1 from coming in contact with the parked vehicle 300b in the rear direction due to a detection error of the position of the parked vehicle 300b in the rear direction. In addition, since the ECU 14 sets the movement route RTP having a margin in the rear direction of the target parking position PT, it is possible to suppress the vehicle 1 from being inclined in the target parking position PT, and thus, parking accuracy can be improved. Accordingly, the steering section 4 can be in neutral at the parking position.

The ECU 14 can reduce the radius of the first circle S1 by generating the first circle S1 that is tangent to the third circle S2 which is the second circle S2a being moved to the front direction compared to a case of generating the first circle S1 so as to be tangent to the second circle S2a. In this way, the ECU 14 can generate the movement route RTP through which the vehicle 1 enters the parking available area 201 as soon as possible in the direction intersecting the forward direction. In other words, the ECU 14 can generate the movement route RTP through which the vehicle 1 enters the safe parking available area 201 as soon as possible where there are only a few travelling vehicles.

If the second circle S2a becomes tangent to the first circle S1 before the outer circumference circle S2b becomes tangent to the avoidance circle S3, the ECU 14 stops the movement of the second circle S2a and generates the third circle S2. In this way, the ECU 14 can set the movement route RTP using the first circle S1 and the third circle S2 on the position where the inner circumference circle S1a is tangent to the avoidance circle S3, and the outer circumference circle S2b is not tangent to the avoidance circle S3. That is, the ECU 14 can determine the movement route RTP such that the end portion of the vehicle 1 does not enter the avoidance circle S3.

If the outer circumference circle S2b becomes tangent to the avoidance circle S3 before the second circle S2a becomes tangent to the first circle S1, the ECU 14 stops the movement of the second circle S2a and generates the third circle S2, and regenerates the first circle S1 that is tangent to the third circle S2. In this way, the ECU 14 can generate the movement route RTP using the first circle S1 and the third circle S2 on the position where the outer circumference circle S2b is tangent to the avoidance circle S3, and the inner circumference circle S1a is not tangent to the avoidance circle S3. That is, the ECU 14 can determine the movement route RTP such that the end portion of the vehicle 1 does not enter the avoidance circle S3.

The embodiment is described, and the embodiment is presented as an example, and it is not intended to limit the scope of this disclosure. These new embodiments can be embodied in various other aspects, and various omissions, substitutions, and changes can be performed without departing from the scope of this disclosure. These embodiments or modifications can be included in the range or scope of this disclosure and also be included in the aspects of this disclosure and the equivalent range thereof.

For example, the avoidance margin a can be changed based on a posture of the driver or a height of the seat. That is, the length of the avoidance margin a may be designated and set by the driver through the operation unit 14g according to a height of the eyes based on the posture of the driver, and the height of the seat. In this case, the driver can perform the desired route determination.

In addition, in the target parking position PT, in a case where the vehicle 1 is determined to be inclined based on an inclination angle, the movement route determination unit 144 may be configured such that a route for performing the forward and backward turnings is further generated, and the movement control unit 145 may be configured so as to perform the forward and backward turnings. In this way, it is possible to perform appropriate parking assistance.

In addition, the initial position PS of the vehicle 1 refers to a starting point on the first circumference, and the control of the vehicle 1 from the stating of the parking assistance for the vehicle 1 to the initial position PS is not excluded. For example, in a case where there is a difference in the directions to the target parking position PT at the initial position PS of the vehicle 1, the movement route determination unit 144 and the movement control unit 145 may be configured such that the vehicle 1 is moved to the initial position PS through the movement route RTP in which the angle of the vehicle 1 is adjusted before the vehicle 1 reaches the initial position PS, and then, the vehicle 1 can move along the movement route RTP which is based on the first circumference and the third circumference.

A parking assistance device according to an aspect of this disclosure includes: a route determination unit that determines a route from an initial position of a vehicle to a target parking position at a time of assisting the vehicle to be parked in a parking area. The route determination unit includes; a first generation unit that generates a first circumference which is tangent to a straight line passing though the initial position and extends along a forward direction of the vehicle, and a second generation unit that generates a second circumference having a tangent line which is a line passing through a rear position of the vehicle positioned at a rear direction of the target parking position in the forward direction of the vehicle and extending along the forward direction of the vehicle, and having a radius as a turning radius at the time of minimum turning of the vehicle. A part of the first circumference functions as a part of the route. A part of a third circumference resulting from moving the second circumference along the forward direction of the vehicle functions as a route subsequent to the first circumference.

As described above, since the parking assistance device generates the route using a third circle resulting from moving a second circle to the front direction, the distance between the vehicle in the rear direction and the target parking position can be increased, and it is possible to suppress the vehicle from coming in contact with the vehicle in the rear direction.

In the parking assistance device described above, the second generation unit may generate the third circumference resulting from moving the second circumference until an avoidance circle having a center at a corner portion of an obstacle disposed in the front direction of the parking area and having a radius as a predetermined distance and an outer circumference circle through which an end portion of the vehicle moving along the third circumference passes, become tangent to each other.

With this configuration, the parking assistance device can generate the route such that the end portion of the vehicle does not enter the avoidance circle.

In the parking assistance device described above, the first generation unit may regenerate the first circumference which is tangent to the third circumference.

With this configuration, the parking assistance device can generate the route using the first circumference and the third circumference that are tangent to each other.

In the parking assistance device described above, the first generation unit may generate the first circumference in which an inner circumference circle through which an end portion of the vehicle moving along the first circumference passes is separated from the avoidance circle.

With this configuration, the parking assistance device can generate the route such that the end portion of the vehicle does not enter the avoidance circle.

In the parking assistance device described above, the first generation unit may generate the first circumference resulting from moving the first circumference until an avoidance circle having a center at a corner portion of an obstacle disposed in the front direction of the parking area and having a radius as a predetermined distance and an inner circumference circle through which the end portion of the vehicle moving along the first circumference passes, become tangent to each other.

With this configuration, the parking assistance device can generate the route such that the end portion of the vehicle does not enter the avoidance circle.

In the parking assistance device described above, the second generation unit may generate the third circumference resulting from moving the second circumference until the second circumference becomes tangent to the first circumference.

With this configuration, the parking assistance device can generate the route using the first circumference and the third circumference that are tangent to each other.

In the parking assistance device described above, the second generation unit may generate the third circumference in which an outer circumference circle through which the end portion of the vehicle moving along the third circumference passes is separated from the avoidance circle.

With this configuration, the parking assistance device can generate the route such that the end portion of the vehicle does not enter the avoidance circle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A parking assistance device comprising:
a route determination unit that determines a route from an initial position of a vehicle to a target parking position at a time of assisting the vehicle to be parked in a parking area,
wherein the route determination unit includes,
a first generation unit that generates a first circumference which is tangent to a straight line passing though the initial position and extending along a forward direction of the vehicle, and
a second generation unit that generates a second circumference having a tangent line which is a line passing through a rear position of a vehicle positioned at a rear direction of the target parking position in the forward direction of the vehicle and extending along the forward direction of the vehicle, and having a radius as a turning radius equal to a minimum turning radium of the vehicle,
wherein a part of the first circumference functions as a part of the route, and
wherein a part of a third circumference resulting from moving the second circumference along the forward direction of the vehicle until the second circumference is tangent to the first circumference functions as a route subsequent to a movement taken along the first circumference.

2. The parking assistance device according to claim 1, wherein the second generation unit generates the third circumference resulting from moving the second circumference until an avoidance circle having a center at a corner portion of an obstacle disposed in the front direction of the parking area and having a radius as a predetermined distance and an outer circumference circle through which an end portion of the vehicle moving along the third circumference passes, become tangent to each other.

3. The parking assistance device according to claim 2, wherein the first generation unit regenerates the first circumference which is tangent to the third circumference.

4. The parking assistance device according to claim 3, wherein the first generation unit generates the first circumference in which an inner circumference circle through which an end portion of the vehicle moving along the first circumference passes is separated from the avoidance circle.

5. The parking assistance device according to claim 1, wherein the first generation unit generates the first circumference resulting from moving the first circumference until an avoidance circle having a center at a corner portion of an obstacle disposed in the front direction of the parking area and having a radius as a predetermined distance and an inner circumference circle through which the end portion of the vehicle moving along the first circumference passes, become tangent to each other.

6. The parking assistance device according to claim 5, wherein the second generation unit generates the third circumference resulting from moving the second circumference until the second circumference becomes tangent to the first circumference.

7. The parking assistance device according to claim 6, wherein the second generation unit generates the third circumference in which an outer circumference circle through which the end portion of the vehicle moving along the third circumference passes is separated from the avoidance circle.

* * * * *